(12) United States Patent
Broome et al.

(10) Patent No.: US 7,372,606 B2
(45) Date of Patent: May 13, 2008

(54) OPTICAL PATTERN GENERATOR USING A SINGLE ROTATING COMPONENT

(75) Inventors: Barry G. Broome, Carlsbad, CA (US); Leonard C DeBenedictis, Palo Alto, CA (US); George Frangineas, Fremont, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 129 days.

(21) Appl. No.: 11/158,907

(22) Filed: Jun. 20, 2005

(65) Prior Publication Data
US 2005/0285928 A1    Dec. 29, 2005

Related U.S. Application Data

(63) Continuation-in-part of application No. 10/750,790, filed on Dec. 31, 2003, now Pat. No. 7,184,184.

(60) Provisional application No. 60/652,891, filed on Feb. 14, 2005.

(51) Int. Cl.
G02B 26/08 (2006.01)
(52) U.S. Cl. .................................... 359/216
(58) Field of Classification Search ............... 359/205, 359/216–218
See application file for complete search history.

(56) References Cited

U.S. PATENT DOCUMENTS

| | | | |
|---|---|---|---|
| 3,619,033 A | 11/1971 | McMahon | |
| 3,622,743 A | 11/1971 | Muncheryan | |
| 3,721,486 A | 3/1973 | Bramley | |
| 4,113,367 A * | 9/1978 | Fritzler | 352/105 |
| 4,129,355 A | 12/1978 | Noguchi | |
| 4,165,464 A | 8/1979 | Ikeda et al. | |
| 4,289,371 A | 9/1981 | Kramer | |
| 4,387,952 A | 6/1983 | Slusher | |
| 4,428,643 A | 1/1984 | Kay | |
| 4,585,297 A | 4/1986 | Hamaguchi et al. | |
| 4,587,396 A | 5/1986 | Rubin | |
| 4,640,573 A | 2/1987 | Kataoka et al. | |
| 4,653,495 A | 3/1987 | Nanaumi | |
| 4,733,660 A | 3/1988 | Itzkan | |
| 4,923,263 A | 5/1990 | Johnson | |
| 4,976,709 A | 12/1990 | Sand | |
| 5,000,752 A | 3/1991 | Hoskin et al. | |

(Continued)

FOREIGN PATENT DOCUMENTS

| | | |
|---|---|---|
| WO | WO 01/26573 A1 | 4/2001 |
| WO | WO 01/39834 A1 | 6/2001 |

OTHER PUBLICATIONS 6,344,051 Withdrawn.
PCT/US2004/043156, International Search Report, Apr. 21, 2005, 3 pages.
Andersen, Dan E. et al., "System for the automated photothermal treatment of cutaneous vascular lesions," Journal of Biomedical Optics 9(2) (Mar./Apr. 2004), pp. 308-314.
Apfelberg, David B. et al., "Dot or Pointillistic Method for Improvement in Results of Hypertrophic Scarring in the Argon Laser Treatment of Portwine Hemangiomas", Lasers in Surgery and Medicine, vol. 6 (1987), pp. 552-558.

(Continued)

*Primary Examiner*—Euncha P. Cherry
(74) *Attorney, Agent, or Firm*—Fenwick & West LLP

(57) ABSTRACT

An optical pattern generator uses a single rotating component. The rotating component includes a number of deflection sectors. Each sector deflects an incident optical beam by a substantially constant angular amount although this amount may vary from one sector to the next. The rotating component may be combined with an imaging lens group that produces, for example, image points, spots, or lines displaced along a line locus.

49 Claims, 15 Drawing Sheets

U.S. PATENT DOCUMENTS

| | | |
|---|---|---|
| 5,018,803 A | 5/1991 | Hecker et al. |
| 5,192,278 A | 3/1993 | Hayes et al. |
| 5,280,378 A | 1/1994 | Lombardo |
| 5,282,797 A | 2/1994 | Chess |
| 5,312,396 A | 5/1994 | Feld et al. |
| 5,336,217 A | 8/1994 | Buys et al. |
| 5,382,770 A | 1/1995 | Black et al. |
| 5,411,502 A | 5/1995 | Zair |
| 5,423,803 A | 6/1995 | Tankovich et al. |
| 5,474,549 A | 12/1995 | Ortiz et al. |
| 5,555,130 A | 9/1996 | Marom et al. |
| 5,558,666 A | 9/1996 | Dewey et al. |
| 5,595,568 A | 1/1997 | Anderson et al. |
| 5,618,284 A | 4/1997 | Sand |
| 5,643,252 A | 7/1997 | Waner et al. |
| 5,735,844 A | 4/1998 | Anderson et al. |
| 5,759,200 A | 6/1998 | Azar |
| 5,810,801 A | 9/1998 | Anderson et al. |
| 5,817,089 A | 10/1998 | Tankovich et al. |
| 5,830,208 A | 11/1998 | Muller |
| 5,885,211 A | 3/1999 | Eppstein et al. |
| 5,897,549 A | 4/1999 | Tankovich |
| 5,906,609 A | 5/1999 | Assa et al. |
| 5,925,035 A | 7/1999 | Tankovich |
| 5,938,657 A | 8/1999 | Assa et al. |
| 5,957,915 A | 9/1999 | Trost |
| 5,964,749 A | 10/1999 | Eckhouse et al. |
| 5,968,033 A | 10/1999 | Fuller et al. |
| 5,983,900 A | 11/1999 | Clement et al. |
| 6,015,404 A | 1/2000 | Altshuler et al. |
| RE36,634 E | 3/2000 | Ghaffari |
| 6,036,684 A | 3/2000 | Tankovich et al. |
| 6,050,990 A | 4/2000 | Tankovich et al. |
| 6,074,382 A | 6/2000 | Asah et al. |
| 6,083,217 A | 7/2000 | Tankovich |
| 6,096,029 A | 8/2000 | O'Donnell, Jr. |
| 6,106,514 A | 8/2000 | O'Donnell, Jr. |
| RE36,872 E | 9/2000 | Zair |
| 6,120,497 A | 9/2000 | Anderson et al. |
| 6,149,644 A | 11/2000 | Xie |
| 6,152,917 A | 11/2000 | Tankovich |
| 6,162,211 A | 12/2000 | Tankovich et al. |
| 6,197,020 B1 | 3/2001 | O'Donnell, Jr. |
| 6,219,575 B1 | 4/2001 | Nemati |
| 6,241,753 B1 | 6/2001 | Knowlton |
| 6,267,771 B1 | 7/2001 | Tankovich et al. |
| 6,273,884 B1 | 8/2001 | Altshuler et al. |
| 6,315,772 B1 | 11/2001 | Marchitto et al. |
| 6,328,733 B1 | 12/2001 | Trost |
| 6,350,261 B1 | 2/2002 | Domankevitz et al. |
| 6,375,672 B1 | 4/2002 | Aksan et al. |
| 6,387,089 B1 | 5/2002 | Kreindel et al. |
| 6,395,000 B1 | 5/2002 | Mitchell et al. |
| 6,413,267 B1 | 7/2002 | Dumoulin-White et al. |
| 6,436,094 B1 | 8/2002 | Reuter |
| 6,443,946 B2 | 9/2002 | Clement et al. |
| 6,483,595 B1 | 11/2002 | Yakovlev et al. |
| 6,493,570 B1 | 12/2002 | Dees et al. |
| 6,508,813 B1 | 1/2003 | Altshuler |
| 6,511,475 B1 | 1/2003 | Altshuler et al. |
| 6,514,244 B2 | 2/2003 | Pope et al. |
| 6,514,278 B1 | 2/2003 | Hibst et al. |
| 6,517,532 B1 | 2/2003 | Altshuler et al. |
| 6,529,543 B1 | 3/2003 | Anderson et al. |
| 6,530,944 B2 | 3/2003 | West et al. |
| 6,533,774 B1 | 3/2003 | Ota |
| 6,533,776 B2 | 3/2003 | Asah et al. |
| 6,537,270 B1 | 3/2003 | Elbrecht et al. |
| 6,544,257 B2 | 4/2003 | Nagase et al. |
| 6,569,155 B1 | 5/2003 | Connors et al. |
| 6,569,156 B1 | 5/2003 | Tankovich et al. |
| 6,572,637 B1 | 6/2003 | Yamazaki et al. |
| 6,575,963 B1 | 6/2003 | Van Saarloos et al. |
| 6,579,283 B1 | 6/2003 | Tobinick |
| 6,605,080 B1 | 8/2003 | Altshuler et al. |
| 6,613,040 B2 | 9/2003 | Tankovich et al. |
| 6,613,042 B1 | 9/2003 | Tankovich et al. |
| 6,632,219 B1 | 10/2003 | Baranov et al. |
| 6,653,618 B2 | 11/2003 | Zenzie |
| 6,659,999 B1 | 12/2003 | Anderson et al. |
| 6,679,877 B2 | 1/2004 | Ota et al. |
| 6,723,090 B2 | 4/2004 | Altshuler et al. |
| 6,733,492 B2 | 5/2004 | Ota et al. |
| 6,758,845 B1 | 7/2004 | Weckwerth et al. |
| 6,813,020 B2 | 11/2004 | Roques et al. |
| 6,813,030 B2 | 11/2004 | Tanno |
| RE38,670 E | 12/2004 | Asah et al. |
| 6,836,278 B2 | 12/2004 | Saito et al. |
| 6,836,364 B2 | 12/2004 | Dube et al. |
| 6,951,558 B2 | 10/2005 | Angeley et al. |
| 6,984,228 B2 | 1/2006 | Anderson et al. |
| 6,997,923 B2 | 2/2006 | Anderson et al. |
| 2001/0007068 A1 | 7/2001 | Ota et al. |
| 2002/0002367 A1 | 1/2002 | Tankovich et al. |
| 2002/0161357 A1 | 10/2002 | Anderson et al. |
| 2003/0032950 A1 | 2/2003 | Altshuler et al. |
| 2003/0039250 A1 | 2/2003 | Altshuler et al. |
| 2003/0055414 A1 | 3/2003 | Altshuler et al. |
| 2003/0109860 A1 | 6/2003 | Black |
| 2003/0138378 A1 | 7/2003 | Hashimshony |
| 2003/0216719 A1 | 11/2003 | DeBenedictis et al. |
| 2004/0015157 A1 | 1/2004 | Connors et al. |
| 2004/0093042 A1 | 5/2004 | Altshuler et al. |
| 2004/0133251 A1 | 7/2004 | Altshuler et al. |
| 2004/0143247 A1 | 7/2004 | Anderson et al. |
| 2004/0206882 A1 | 10/2004 | Banks et al. |
| 2005/0143719 A1 | 6/2005 | Sink |
| 2005/0259306 A1 | 11/2005 | Broome et al. |
| 2006/0116669 A1 | 6/2006 | Dolleris |

OTHER PUBLICATIONS

Apfelberg, David B., "Intralesional Laser Photocoagulation—Steroids as an Adjunct to Surgery for Massive Hermangiomas and Vascular Malformations", Annals of Plastic Surgery, vol. 35, No. 2 (Aug. 1995), pp. 144-149.

Fujii, Hitoshi et al., "Multispot laser photocoagulation system using a fiber bundle scanner," Applied Optics, vol. 21, No. 19, Oct. 1, 1982, pp. 3437-3442.

Manstein, Dieter et al., "Fractional Photothermoysis: A New Concept for Cutaneous Remodeling Using Microscopic Patterns of Thermal Injury," Lasers in Surgery and Medicine, vol. 34 (2004), pp. 426-438.

Wyant, J.C., "Rotating Diffraction Grating Laser Beam Scanner," *Applied Optics*, vol. 14, May 1975, pp. 1057-1058.

Wyant, J.C., "Rotating Diffraction Grating Laser Beam Scanner," Applied Optics, May 1975, pp. 1057-1058, vol. 14, No. 5.

International Search Report and Written Opinion, PCT/US05/28095, Jul. 7, 2006, 12 pages.

International Search Report and Written Opinion, PCT/US06/04821, Feb. 26, 2007, 8 pages.

International Search Report and Written Opinion, PCT/US06/05411, Sep. 20, 2007, 10 pages.

* cited by examiner

OPTICAL PATTERN GENERATOR USING A SINGLE ROTATING COMPONENT

CROSS-REFERENCE TO RELATED APPLICATION(S)

This application claims priority under 35 U.S.C. § 119(e) to U.S. Provisional Patent Application Ser. No. 60/652,891, "High Efficiency, High Speed Optical Pattern Generator Using a Single Rotating Component," filed Feb. 14, 2005; and is a continuation-in-part of U.S. patent application Ser. No. 10/750,790, "High Speed, High Efficiency Optical Pattern Generator Using Rotating Optical Elements," filed Dec. 31, 2003. The subject matter of all of the foregoing are incorporated herein by reference in their entirety.

BACKGROUND OF THE INVENTION

1. Field of the Invention

This invention relates generally to optically generating a pattern of figures such as arrays of image points, spots, or lines. More particularly, this invention relates to generating such patterns using a single rotating component that has a plurality of deflection sectors that deflect an incident optical beam by various amounts.

2. Description of the Related Art

The optical generation of a pre-defined pattern of spots or scan lines is used in a variety of applications. Digital copiers, printers, fingerprint identification, hand-held bar code scanners, industrial applications, light show entertainment, displays, telecommunications switching and medical applications are a few examples. Perhaps the most common mechanisms for generating patterns of figures are tilting mirrors (e.g., oscillating mirrors driven by galvanometers) and reflections from rotating convex polygons.

However, optical pattern generators based on tilting mirrors typically have characteristics that make them unsuitable for certain applications. For example, scanning in these systems is typically achieved by tilting a mirror back and forth. But back and forth motion requires that the mirror come to a stop and then reverse direction. This takes time, which limits the scan rate. In order to increase the scan rate of these systems, the mirror often is driven with an oscillating motion at a rate that is near its resonant frequency. However, this severely restricts the patterns that can be generated. For example, it is difficult to generate irregular patterns since the mirror motion is constrained to be oscillatory. The near-resonance condition also limits the range of scan rates that can be achieved. For example, it is difficult to tune such a system over a wide range of scan rates since the near-resonance condition cannot be met over a wide range. In addition, the angular scan velocity of resonant scanners is usually sinusoidal and not suitable for a large number of applications where dwell time at each point must be reasonable constant.

If a two-dimensional pattern is desired (e.g., a series of parallel scan lines or a two-dimensional pattern of spots), then typically either a single mirror is tilted in two directions simultaneously or two coordinated, tilting mirrors are used. In many cases the efficiency of the utilization of light, such as laser light, is also important. The efficiency may be defined as the fraction of energy deposited in a desired pattern on the treatment surface compared to the total energy produced by the light source in a given period of time. If a pattern is sparse compared to the background, it is preferable to turn off the light source and scan quickly over the background, and then turn it back on when the light beam has settled over the spot to be exposed and expose the spots in the pattern in such a manner that the light source is efficiently utilized in time. This requires an even more responsive device that can accelerate, decelerate and settle quickly. As a result of these characteristics, galvanometer-based systems and convex polygon systems are not well suited for high speed pattern generation, particularly if the pattern is an irregular or a sparse one.

In the rotating polygon approach, the sides of a three-dimensional polygon are mirrored and the polygon is rotated about a center axis. As each mirrored side rotates through an incident optical beam, the optical beam is reflected to generate a point on a scan line. The rotation of each mirrored side through the optical beam produces one scan line. If all of the mirrored sides are the same (e.g., make the same pyramid angle with the base of the polygon), then the same scan line is traced over and over. If the mirrored sides are different, then different scan lines can be traced as each side rotates through the optical beam. For example, by varying the pyramid angle of each side, the reflected optical beam can trace a series of scan lines.

However, the rotating polygon approach also has drawbacks that make it unsuitable for certain applications. For example, systems that produce a series of scan lines can suffer from aberrations due to the rotation. In order to trace a series of scan lines, each side has a different pyramid angle that offsets the basic scan line in a direction that is perpendicular to the scan direction. However, as each side rotates through the optical beam, the orientation of the angled side is also rotated. This can cause changes in the amount of offset and/or other unwanted aberrations. One example is scan line bow. The ideal scan line is generally a straight line segment but the actual scan line is often an arc segment. The sag of the arc segment is the bow. In the case of rotating polygon scanners, sides that have non-zero pyramid angles generate bowed scan lines. The amount of bowing depends on the pyramid angle. In a polygon scanner where different pyramid angles are used to trace multiple scan lines or to generate spots at different locations, not only will each scan line be bowed, but the bow will vary from one scan line to the next. The difference between the bow of the top-most scan line and the bottom-most scan line can be significant.

Scan line bow and other effects caused by rotation can cause additional problems, depending on the application. For example, in some applications, the scanning action is used to compensate for motion of the scanner relative to a target so that the optical beam ideally remains at a fixed spot on the target even though the scanner is moving relative to the target. In this case, scan line bow will cause the optical beam to move in the direction perpendicular to the scan direction. If this motion is slow compared to the dwell time of the optical beam on the target, then the bow effectively introduces an unwanted motion in the perpendicular direction. If the motion is fast relative to the dwell time of the optical beam on the target, then the bow, which is a radial deflection, when combined with the uncompensated tangential motion, effectively blurs the optical beam, increasing the spot size of the beam on the target. Typically, neither effect is desirable.

Thus, there is a need for optical pattern generators than can operate at high speeds with long dwell times at each image point, particularly for the generation of irregular patterns. There is also a need for pattern generators with reduced aberrations and/or image blurring.

SUMMARY OF THE INVENTION

The present invention overcomes the limitations of the prior art by providing an optical pattern generator using a single rotating component. The rotating component includes a number of deflection sectors containing optical elements. Each sector deflects an incident optical beam by a substantially constant angle although this angle may vary from one sector to the next. The rotating component may be combined with an imaging group that produces, for example, image points, spots, or lines displaced along a line locus. The image spots can also be displaced to either side of a line, for example by introducing a tilt in the orthogonal direction.

This approach can result in many advantages. The use of a single rotating component with sectors that are positioned contiguously around its periphery can provide a high radiometric efficiency. The geometry of a rotating component such as a thin disk with optical elements located on the periphery facilitates rotation at high angular velocities, thus producing image patterns at high rates of speed. The angular velocity of the rotating component combined with the pseudo-stationary angular deflection can be used to cause the individual image points, spots, or lines to deliver high radiant energy doses to a small point in the image space with high radiometric efficiency. The angular deflection is pseudo-stationary in the sense that each deflection sector produces an approximately constant angular deflection as it rotates through the incident optical beam, but each deflection sector can have a different constant angular deflection.

Another advantage of a single rotating component compared to two counter-rotating components is that the synchronization between two counter-rotating components and its attendant high cost is avoided. The drive mechanism for a single rotating component is less complex than for two counter-rotating components because the angular velocity can be rapidly changed without the additional requirement of maintaining synchronism. The use of one rather than two rotating components can also reduce size and weight. The packing geometry of the optical elements can also result in a more compact rotating component, and the number of components with their attendant cost can be significantly reduced.

In one aspect of the invention, the preferred embodiments use reflective surfaces which permit the optical pattern generator to be independent of the wavelengths of the incident optical beams and thereby permits the simultaneous identical pattern generation of several different wavelengths in applications that can benefit from this condition.

In one application, a scanner produces optical patterns that consist of spots or line segments displaced along a straight line locus. Two dimensional patterns are developed by movement of the target area with respect to the pattern generator. Implementations of the present invention can utilize this "painting" concept but can also provide patterns that have a "zig-zag" image point pattern. The use of zig-zag image point patterns in certain applications has the advantage of preventing thermal interaction between neighboring image points, for example sparing biologic tissue from damage and preventing accidental cutting of biologic tissue.

In certain embodiments, an optical pattern generator includes a single rotating component that has a plurality of deflection sectors arranged on the outer periphery of a rotating disk. The incident optical beam propagates in the plane of rotation for the disk. The disk presents its edge, which contains the sectors, to the incident optical beam. The sectors travel through the incident optical beam as the disk rotates. Each sector includes a pair of opposing planar mirrors which have surface normals that are also in the plane of rotation. The incident optical beam reflects from one mirror to the other mirror and subsequently exits the rotating component at a deflection angle that is roughly ninety degrees relative to the optical beam's incidence angle. The optical path through the mirrors lies primarily in the plane of the disk. This arrangement of two mirrors has the quality that the deflection angle does not change as the pair of mirrors rotates through the incident optical beam. Therefore, the pair of mirrors at the periphery of a rotating disk component will move through the incident optical beam and produce an exit optical beam that has a constant deflection angle with respect to the incident optical beam. Successive pairs of mirrors (i.e., different sectors) may have different included angles such that different pairs of mirrors can deflect the exit optical beam by different amounts. This geometry therefore produces a pseudo-stationary deflection (PSD) pattern generation.

This example geometry produces an output optical beam from the rotating component that is collimated (assuming a collimated incident optical beam). The output optical beam can be presented to subsequent imaging optics at a set of selectable beam angles corresponding to different sectors. The subsequent imaging optics can include a simple reflective objective that produces an image pattern that is independent of the wavelengths present in the incident beam. Refractive, diffractive, or holographic objective systems can also be used.

For this embodiment, example image patterns include a series of image points displaced along an image line locus if the reflective surfaces have a tilt component in only a single direction. The image pattern can include image points displaced in a zig-zag pattern along the image line locus if the reflective surfaces also have a small tilt component in the orthogonal direction.

To reduce thermal blooming or other unwanted effects due to the sequential irradiation of adjacent image points, the sectors on the rotating component can be designed such that non-neighboring points in the image pattern are sequentially irradiated without reducing the speed or radiometric efficiency of the system. Galvanometric and other pattern generators typically do not have this capability.

Another embodiment uses pairs of planar mirrors arranged in a rhomboid configuration. One mirror of each pair on one side of the rotating component corresponds with a second mirror on the opposing side of the rotating component. The incident optical beam is reflected from the first mirror, passes across the center of the rotating disk component, and reflects from the second mirror of the mirror pair. The tilt angles for the mirror pairs are approximately at 45 degrees with respect to the incident or outgoing optical beams. In one embodiment, the tilt angle for each mirror of one mirror pair is at 45 degrees, and the tilt angles for other mirror pairs changes slightly such that the outgoing optical beam exits at a different angle relative to the incident beam angle. This geometry also maintains the exit beam angle invariance condition. As long as the incident beam is on a selected mirror pair, the exit beam angle is invariant with respect to rotation of the mirror pair. The exiting beams are PSD invariant as for the previous embodiment. Any combination of an even number of mirrors rotating together in a plane containing an incident optical beam can be designed to have the property of PSD pattern generation.

Other embodiments use a single rotating component where the incident optical beam originates outside the rotating component and propagates in a direction that is not in the plane of rotation for the rotating component. For example, the incident optical beam may be directed onto two optical surfaces placed on a disk that presents its face to the incident optical beam.

In an embodiment based on this geometry, sectors comprise two mirrors in a 'Z-folded' arrangement that causes the exit optical beam to be approximately collinear to the incident optical beam. Each sector can have a different included angle between the mirrors in the sector, such that different sectors cause different angular deflections. The two mirrors can be planar or they can be sections of larger parent surfaces of revolution such as spheres or aspheres. Angular deflection can be maintained at a nearly constant level by making the optical axes of each mirror surface coincident with the rotation axis of the disk so that rotation of the disk does not change the form of the optical surfaces presented to the incident optical beam.

In yet other embodiments, a single rotating component has sectors arranged around the periphery, similar to the cylindrical section of a barrel. The incident optical beam is injected from inside the cylindrical section. These embodiments preferably use transmissive optical elements instead of reflective optical elements, but reflective surfaces can also be used for example when wavelength independence is important. Transmissive diffractive structures on the outer surface of the cylinder are the preferred optical elements.

The optical pattern generators described above can be used for various applications. For example, they can be used to deposit optical energy onto human tissue, either externally onto the skin for example or internally through various orifices. The optical energy can be used to accomplish different purposes: local heating, ablation, cutting or cauterizing for example. The devices can also be used to deposit optical energy onto other materials: metal, powders, or other industrial materials for example. Cutting, welding, ablation and marking are examples of manufacturing processes that can be implemented. The devices can also be used in laser or LED printers, optical imaging scanners, or copy machines. Other applications will be apparent.

Other aspects of the invention include methods corresponding to the devices, systems and applications described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1A:
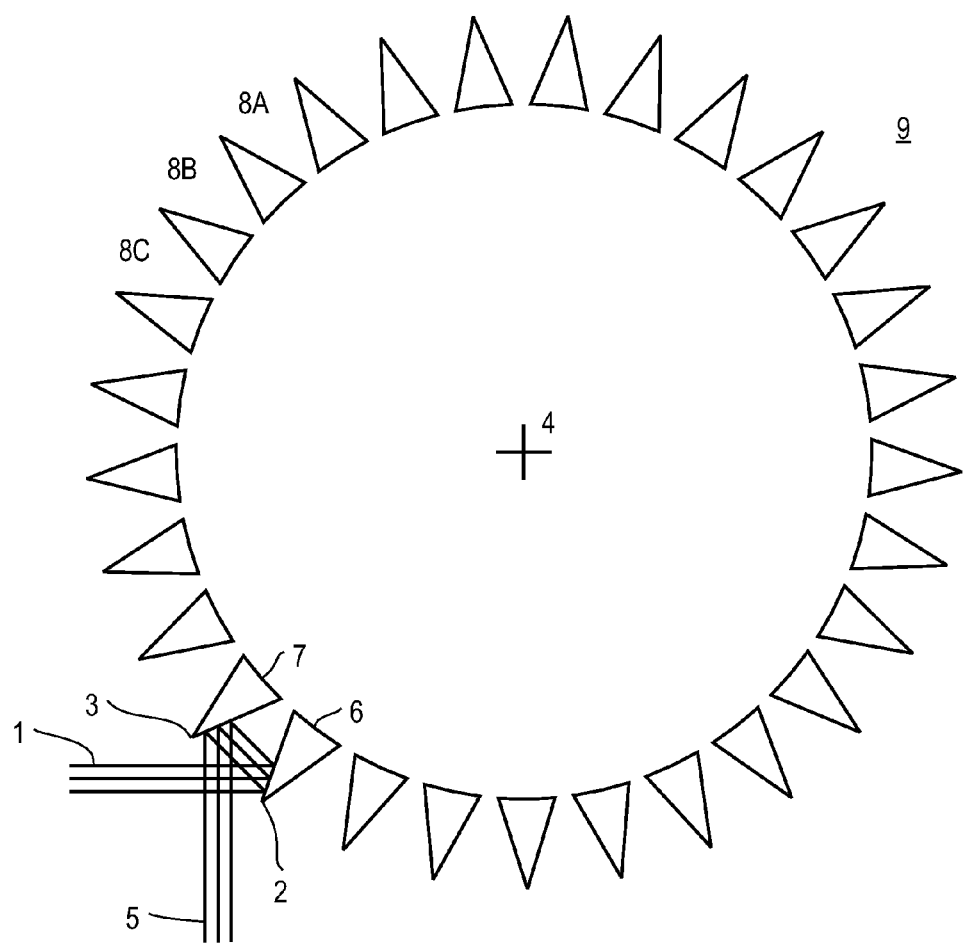
FIG. 1A is a side view of an optical pattern generator according to the invention, where the incident optical beam lies substantially in the plane of rotation.

FIG. 1A is a side view of an optical pattern generator according to the invention, where the incident optical beam 1 lies substantially in the plane of rotation of rotatable component 9. In this example, the rotating component 9 is divided into twenty nine sectors 8A, 8B, 8C, etc., which are arranged in a circle centered on the rotation axis 4 of the rotating component 9. The incident optical beam 1 propagates along a direction that lies in the plane of rotation. Each sector 8 includes a pair of reflective elements (e.g., reflective surfaces 2 and 3 for the sector that is currently active). The surface normals of the reflective surfaces have a substantial component in the plane of rotation. In this example, the rotating component 9 includes prisms 6, 7, etc. that are arranged in a circle. The faces of the prisms are reflectively coated and the reflectively coated surfaces from adjacent prisms (e.g., reflective surfaces 2 and 3 from prisms 6 and 7) form the opposing reflective surfaces for a sector. Discrete structures other than prisms can also be used and the reflective surfaces need not be planar. Small flat mirrors can be used in the place of the prism components.

As the component 9 rotates, the sectors 8 rotate through the incident optical beam 1. Each sector 8 deflects the incoming optical beam 1 by some angular amount. The sectors 8 are designed so that the angular deflection is approximately constant as each sector rotates through the incident optical beam 1, but the angular deflection may vary from sector to sector. In more detail, the incident optical beam 1 reflects from the first reflective surface 2 on prism 6, and subsequently reflects from reflective surface 3 on prism 7 before exiting as output optical beam 5.

The two reflective surfaces 2 and 3 form a Penta mirror geometry. An even number of reflective surfaces that rotate together in the plane of the folded optical path has the property that the angular deflection is invariant with the rotation angle of the reflective surfaces. In this case, there are two reflective surfaces 2, 3 and rotation of the disk 9 causes the prisms 6, 7 and their reflective surfaces 2, 3 to rotate together in the plane of the folded optical path. As a result, the output beam angle 5 does not change as the two reflective surfaces 2, 3 rotate through the incident optical beam 1. The reflective surfaces 2, 3 are self-compensating with respect to rotation of the disk 9. Furthermore, if the reflective surfaces 2, 3 are planar, they will also be substantially spatially invariant with respect to disk wobble.

As the disk 9 rotates clockwise to the next sector 8 and the next two reflective surfaces, the angular deflection can be changed by using a different included angle between the opposing reflective surfaces. For this configuration, the beam will be deflected by an angle that is twice that of the included angle. For example, if the included angle for sector 8A is 45 degrees, sector 8A will deflect the incident optical beam by 90 degrees. If the included angle for sector 8B is 44.5 degrees, then the incident optical beam will be deflected 89 degrees, and so on. In this example, different included angles are used for each of the sectors so that each sector will produce an output optical beam that is deflected by a different amount. However, the deflection angle will be substantially invariant within each sector due to the even number of reflective surfaces rotating together through the incident beam. For this example, the angular deflections have a nominal magnitude of 90 degrees and a variance of −15 to +15 degrees from the nominal magnitude.

Figure 1B:
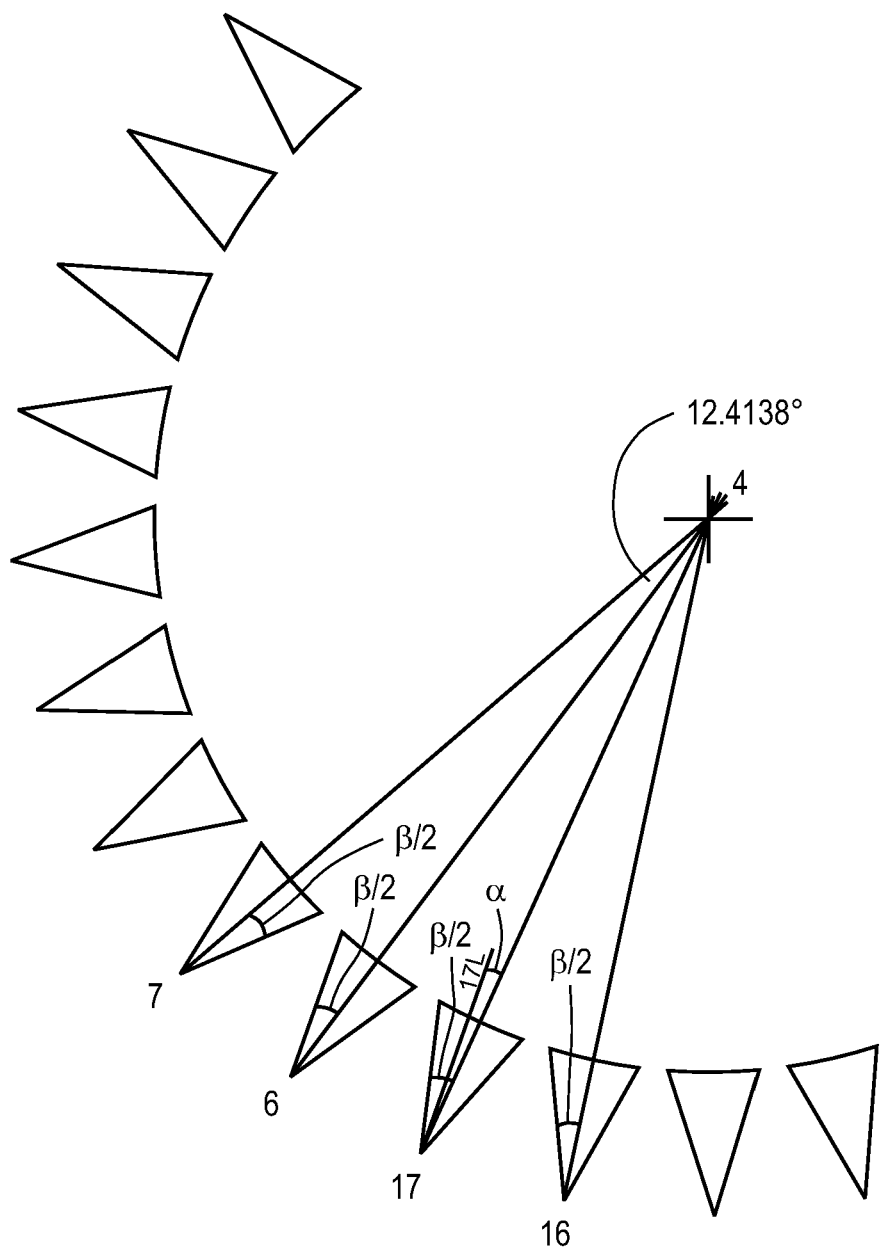
FIG. 1B is a close-up showing tilting of the prisms in FIG. 1A.

In this example, the apex angle of each prism is 32.5862 degrees, calculated as follows. Each sector 8 subtends an equal angular amount. Since there are twenty nine sectors, each sector subtends 360/29=12.4138 degrees as shown in FIG. 1B. The two prisms 6 and 7 have the same shape and, therefore, the same apex angle β. The component 9 is designed so that when the included angle is 45 degrees, the prisms 6 and 7 are positioned so that the line that bisects the apex angle also passes through the rotation axis 4. Therefore, the design must satisfy the equation β/2+12.4138+β/2=45. Solving yields an apex angle of β=32.5862 degrees.

The next prism 17 moving counterclockwise on the disk 9 from prism 6 is tilted slightly by an angle +α so its bisecting line 17L does not pass through the center of rotation 4 of the disk. As a result, the included angle for the sector formed by prisms 6 and 17 is (β/2+α)+12.4138+β/2=45+α. The next prism 16 is once again aligned with the rotation center 4, so the included angle for the sector formed by prisms 16 and 17 is (β/2−α)+12.4138+β/2=45−α. The next prism is tilted by +2α, followed by an aligned prism, and then a prism tilted by +3α, followed by another aligned prism, etc. This geometry is maintained around the periphery of disk 4. This specific arrangement produces twenty nine deflection angles that vary over the range of −15 degrees to +15 degrees relative to the nominal 90 degree magnitude. Note that this approach uses an odd number of sectors where every other (approximately) prism is aligned and the alternate prisms are tilted by angles α, 2α, 3α, etc.

Other numbers of sectors and different deflection angle patterns can be produced by variants of this specific geometry. In addition, other rotation schemes are possible that produce the same angular deflection but do not produce them in monotonically increasing order. As another example, the rotating component could have an even number of sectors and prisms, with every other prism aligned and the alternate prisms tilted by angles α/2, 3α/2, 5α/2, etc. This would produce a set of angular deflections centered around a nominal magnitude, but without producing a deflection actually at the nominal magnitude.

In another approach, the rotation scheme causes the angular deflections to be arranged in a sequence such that the final delivered spots are not produced in sequential order. In other words, if the pattern is an array of spots 1, 2, 3, . . . 29, the sectors may be designed to generate the spots in an order other than sequentially from 1 to 29. For certain applications, producing adjacent spots within a short period of time can cause thermal coupling between the irradiated regions, and this can be deleterious to proper treatment. By arranging the prisms appropriately, the spots can be delivered such that temporally successive spots are spatially separated from each other while still delivering the full pattern of spots.

There is another geometric symmetry that is beneficial for some applications. Certain applications benefit by image patterns that are arranged to be in a zig-zag rather than a straight line geometry. For example, in some biologic applications, if the image spots are arranged along a straight line and high irradiance levels are present, the irradiation may accidentally cut tissue in the manner of a laser scalpel. Depositing the image spots in a zig-zag pattern substantially reduces the propensity for cutting or for undesirable thermal damage to biologic tissue while still permitting the thermal treatment level to be delivered. To achieve the zig-zag pattern, the prisms in the above-described geometry that have a rotation angle α applied to them can also have an orthogonal tilt angle applied to produce the lateral spot displacements used to produce a zig-zag geometry.

Figure 2A:
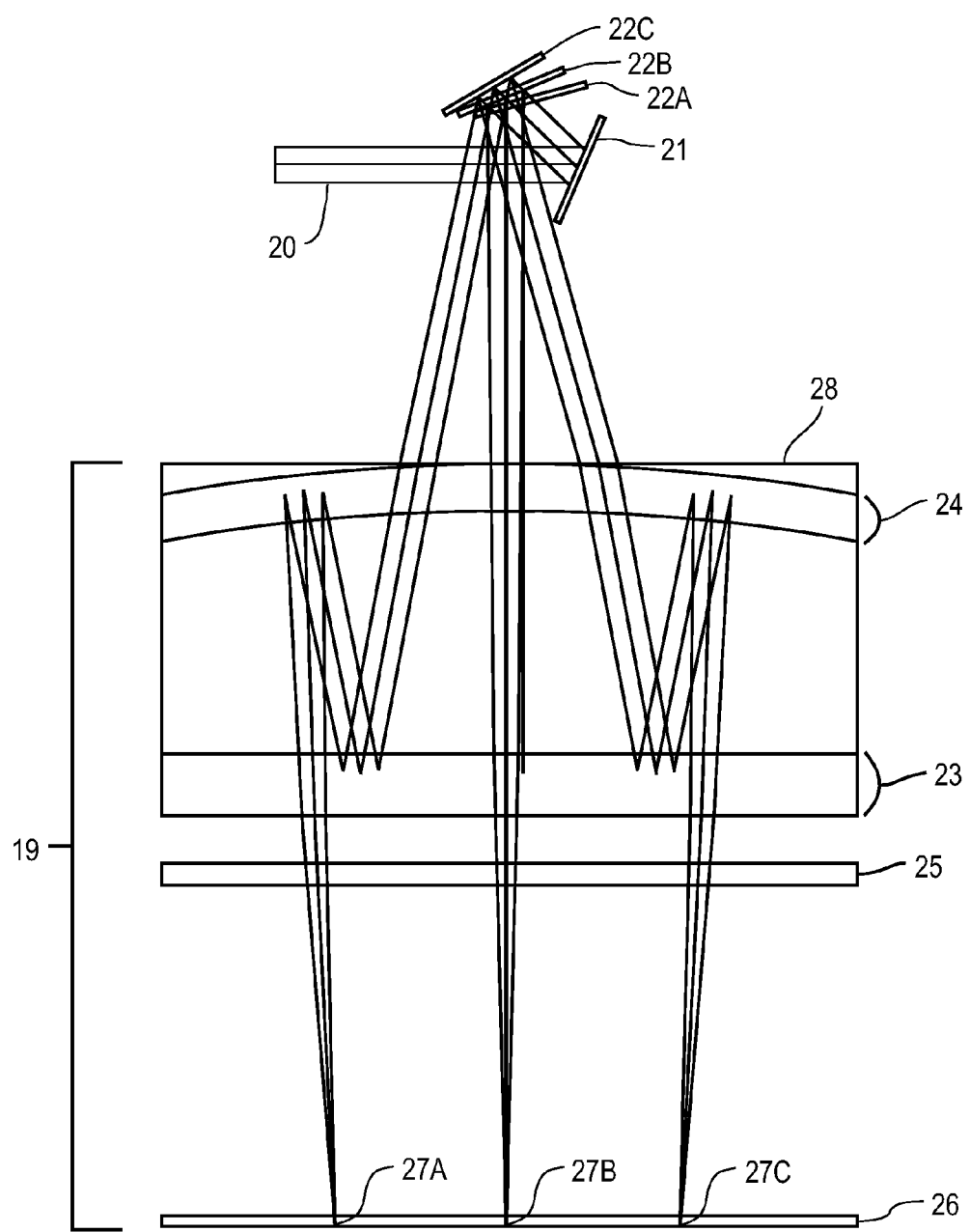
FIGS. 2A and 2B are a side view and end view of the optical pattern generator of FIG. 1 combined with a reflective imaging group.
Figure 2B:
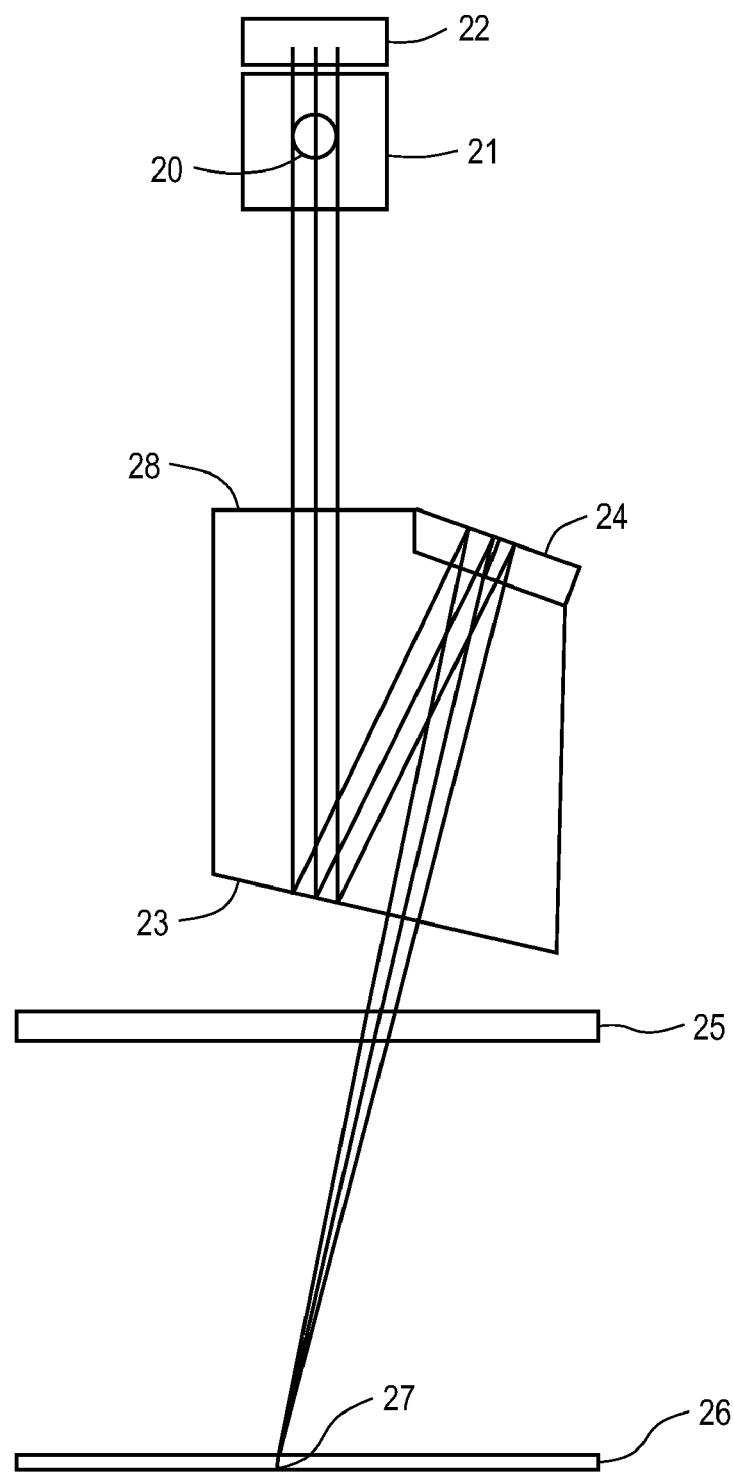

In this example application, the family of output optical beams with different deflection angles subsequently enters an imaging lens group 19, as shown in FIGS. 2A and 2B, thus forming a pattern of spots displaced along a line focus. Many imaging optics groups are possible using refractive, reflective, diffractive, or catadioptric forms. The preferred embodiment of FIGS. 2A-2B uses a solid catadioptric ("solid cat") form which is easily manufactured and maintains freedom from chromatic aberrations over a wide spectral range. FIG. 2A is a side view of the optical pattern generator system (i.e., same view as FIG. 1A) and FIG. 2B is an end view of the system (i.e., viewer to the left in FIG. 1A).

FIG. 2A shows a solid catadioptric imaging lens group 19 combined with the rotating component 9 described above. In this view, only the reflective surfaces 21, 22 of the rotating component 9 are shown and three different disk rotation positions are shown. The incident optical beam 20 is first reflected from surface 21 and then reflected from surface 22A. The optical beam enters the imaging lens group 19 and forms the spot 27A. Two other positions of the rotating disk 9 are also shown. When the input optical beam 20 reflects from surface 21 and then from surface 22B, the spot 27B is formed. When the input optical beam 20 reflects from surface 21 and then from surface 22C, the spot 27C is formed. Note that FIG. 2A shows an embodiment where the reflecting surface 21 is at the same angle for all of the optical paths. This is not a required condition and the geometry more frequently will use reflecting surfaces 21A, 21B and 21C with different angles and Cartesian coordinates to achieve specific image array patterns.

FIGS. 2A-2B show the details of one embodiment of a solid cat imaging lens group. The optical beams exiting from the rotating component 19 first enter a planar surface 28, are reflected from a planar mirror 23, are reflected from a spherical mirror 24, and exit from a planar surface which in this case is a continuation of surface 23. Element 25 is an optical window which seals the imaging lens group to maintain clean optical surfaces and item 26 is an optical window that for some biologic applications is useful to maintain optical contact with the biologic tissue being treated.

The geometry of this solid cat imaging lens group can be produced by classical optical fabrication methods in a highly precise and cost effective manner. In one approach, the spherical reflecting surface 24 is first produced in the material, and then the planar entry surface 28 is generated into the spherical surface. The planar reflecting surface 23 serves as the exit window. The geometry has an important advantage over other imaging lens groups in that the exit beams as shown in FIG. 2A are essentially telecentric.

Telecentric exit beam geometries are advantageous for many biologic and industrial fabrication applications.

Figure 3:
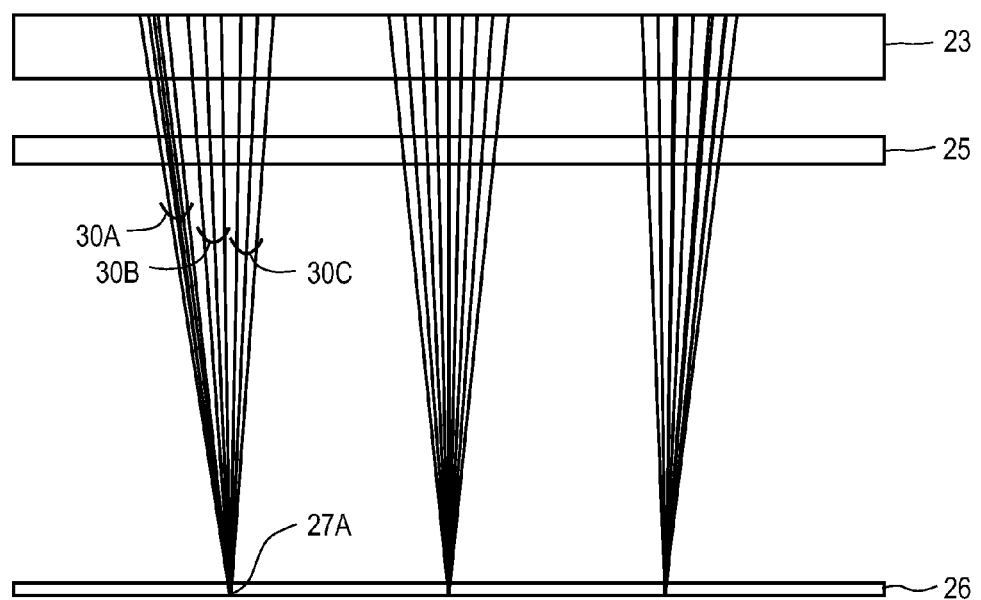
FIG. 3 is a detail view of the focal area of the system of FIG. 2.

FIG. 3 shows a detailed view of the ray fans 30 that produce three image spots 27 at the focal plane of the system. In FIG. 3, each of the three image points have three sets of ray fans that are associated with a different rotation angle of the corresponding sector as it rotates through the incident optical beam. For example, ray fans 30A, 30B and 30C are shown for image spot 27A. Ray fan 30A might correspond to the sector just entering the incident optical beam, fan 30B to a rotation angle midway through the optical beam and ray fan 30B to the sector exiting the optical beam. Note that for the image spots 27, the optical beam moves slightly in the plane of the paper. For example, as shown in FIG. 3, ray fans 30A, 30B and 30C are slightly offset in angle with respect to each other even though they converge at the same focus spot 27A. Although three sets of ray fans are shown for clarity, there is actually a continuum of ray sets produced by the continuous movement of the respective sector through the incident optical beam.

For certain applications, the movement of the ray fans can have advantageous qualities. When the image spot is focused inside a tissue such as the human skin, the energy density is maximum for all rotation angles of the respective mirror pair at the internal focal point, while the energy density pattern moves on the outer skin surface thereby keeping the thermal effects at the skin surface much lower than at the internal treatment region. This condition can permit treatment of internal tissue features at high thermal levels while keeping the external tissue features at lower thermal levels and not producing unwanted damage to the tissue surface. The movement of the ray fans along a target plane is also useful in applications such as seam welding where long linear patterns can be used. It may be desired to operate the scanner with the target plane tilted and/or displaced relative to the image plane in order to achieve the desired movement of the ray fans for each of the beams.

Figure 4:
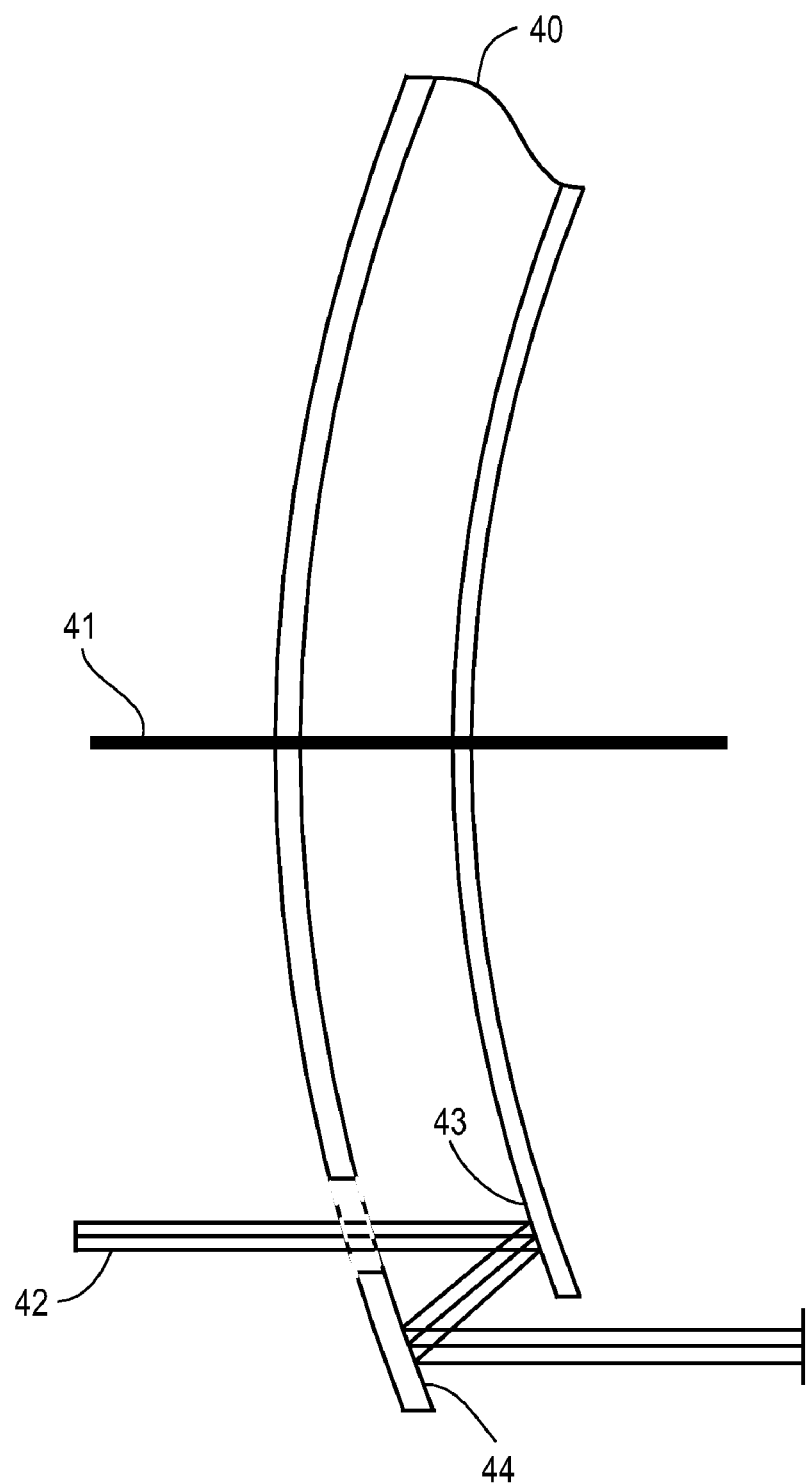
FIG. 4 is a side view illustrating the principle of operation of another optical pattern generator according to the invention, where the incident optical beam has a substantial component in a direction normal to the plane of rotation and the full parent surfaces of the reflective segments are shown.

FIG. 4 is a view of another optical pattern generator according to the invention, where the direction of propagation for the incident optical beam 42 has a substantial component in a direction normal to the plane of rotation. This pattern generator also uses a single rotating component 40 with rotation axis 41 to generate the pattern of interest. In this example, the disk 40 supports reflective segments 43, 44 that are rotated through the incident optical beam. The segments have parent optical surfaces that are rotationally symmetric, with their optical axes coincident with the rotation axis 41 of the rotating component. FIG. 4 shows the large, parent optical surfaces with their smaller reflective segments 43, 44 where the beam 42 reflects twice and then exits the pattern generator. In FIG. 4, the rotating component includes a disk 40 with pairs of opposing reflective surfaces 43, 44 for each sector, where different sectors may contain reflective surfaces with different radii of curvature such that the exiting beams will be displaced at different angles for each sector, but retain the PSD condition. Because surfaces 43, 44 are rotationally symmetric and are rotated about their optical centerlines, both of the surfaces 43, 44 that intersect with the optical beam are spatially invariant with respect to rotation. The radii of the two reflective segments 43, 44 and their axial separation are chosen to keep the system approximately afocal for all segments while simultaneously varying the output beam angle.

Figure 5A:
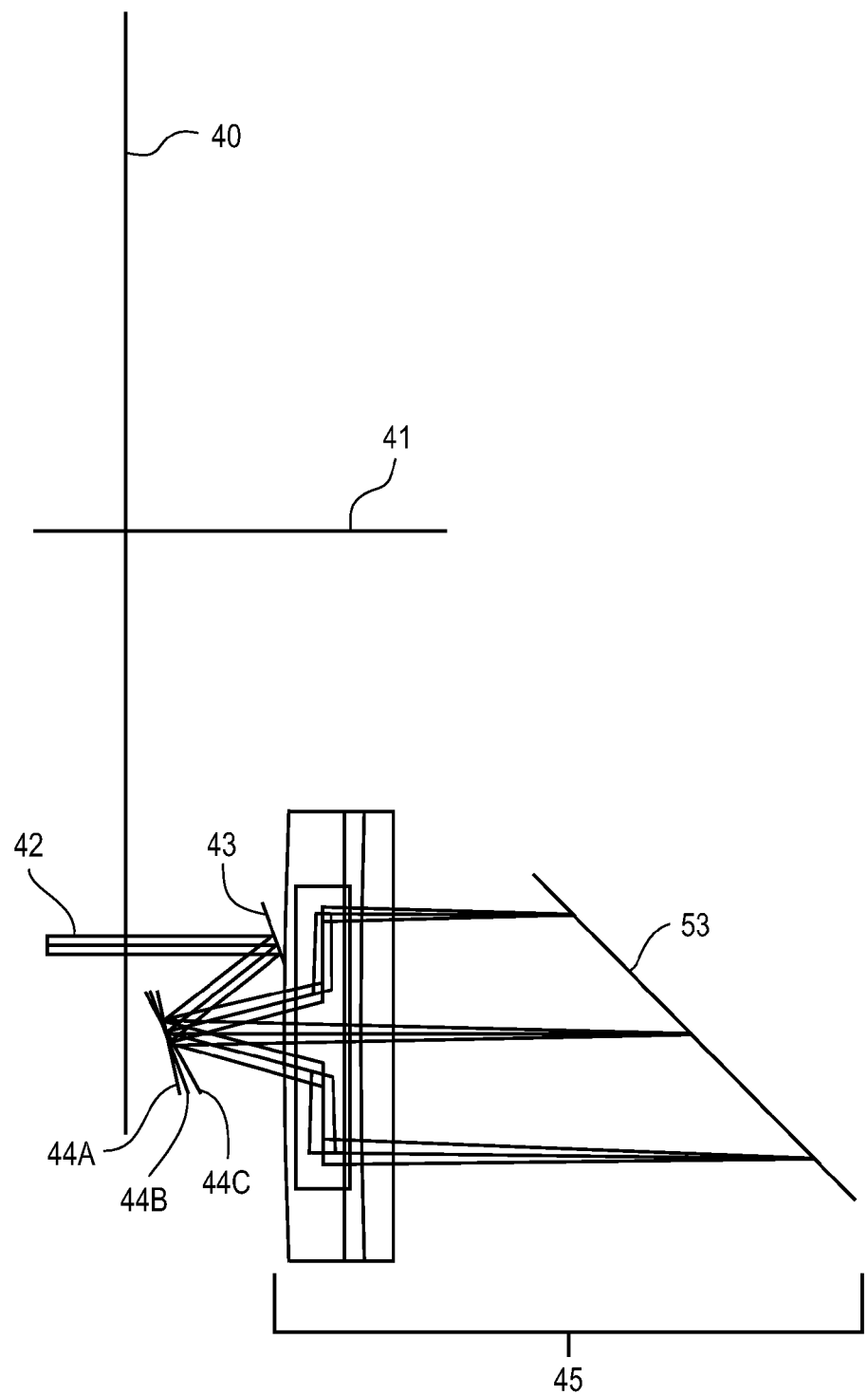
FIGS. 5A-5C are a side view, perspective view and top view, respectively, of the optical pattern generator of FIG. 4 combined with a reflective imaging group.

FIG. 5A shows a side view of the optical pattern generator described in FIG. 4 combined with a reflective imaging lens group. Refractive and diffractive imaging lens groups could also be used. The input beam 42 is reflected from the first surface segment 43 and then reflects from the second surface segment 44A. In this specific embodiment, the surface segment 43 is the same surface for all sequential segments whereas the second surface segment radius is different for each sequential segment and is shown as 44A, 44B, and 44C. Variations of this embodiment are also possible using different first surface radii for sequential segments and these segments would then be represented by 43A, 43B, and 43C respectively. The variation in angular deflection from the rotating component would then be due to the different radii on the first surface segments 43.

For the specific embodiment where surface segment 43 remains the same for all sequential optical paths, the surface segment may be non-rotating. For example, it may be firmly fixed to the imaging lens group 45 rather than to the disk 40.

In FIG. 5A, the imaging lens group 45 forms an image pattern comprised of the three spots produced by three sequential sectors on the image plane 53. For this optical pattern generator, the stigmatic (i.e., sharply focused) images lie on a surface that is tilted with respect to the optical axis of the imaging lens group 45. This image surface tilt is a consequence of the fact that only one of the surface segment pairs can have the two radii and separation distance that causes the exiting beam to be collinear with the input beam and also have no refractive power added to the beam. Other surface segment pairs require that their radii and separation distance be chosen to achieve the desired output beam angular deviation. To make the angular deviation less than the optical path that produces the collinear output beam, the first reflective surface 43C generally becomes flatter or has an increased radius of curvature while the second reflective surface 44C becomes steeper or has a decreased radius of curvature. This means that the two surfaces no longer produce an afocal pair and positive power is added to the output beam causing it to focus closer to the imaging lens group. When the output beam angular deflection is greater than the collinear output beam, the reverse occurs and negative power is added to the output beam so that it focuses further from the imaging lens group.

To achieve near diffraction-limited image spots, it is advantageous to use surface segments that are segments of aspheric surfaces of revolution with their optical axes coincident with the rotation axis 41 of the system. Some applications can have larger image spots and for these cases spherical surfaces of rotation can be acceptable.

For some applications that do not require high optical throughput efficiency, the beam is on for only a short portion of the rotation range of each sector. The surface segments can be made toric aspheres so the refractive power can be cancelled for each of the surface segment pairs. This causes a small movement of the image spots as the surface segment pair rotates through the incident optical beam. The direction of movement is orthogonal to the direction that the spot is displaced from the system optical axis. The orthogonal image displacement is a function of the toric power of the surfaces, so each spot in the image moves orthogonal to its displacement distance by a different amount. This condition can be tolerated if the duty cycle (i.e. radiometric efficiency) of the system is low.

Figure 5B:
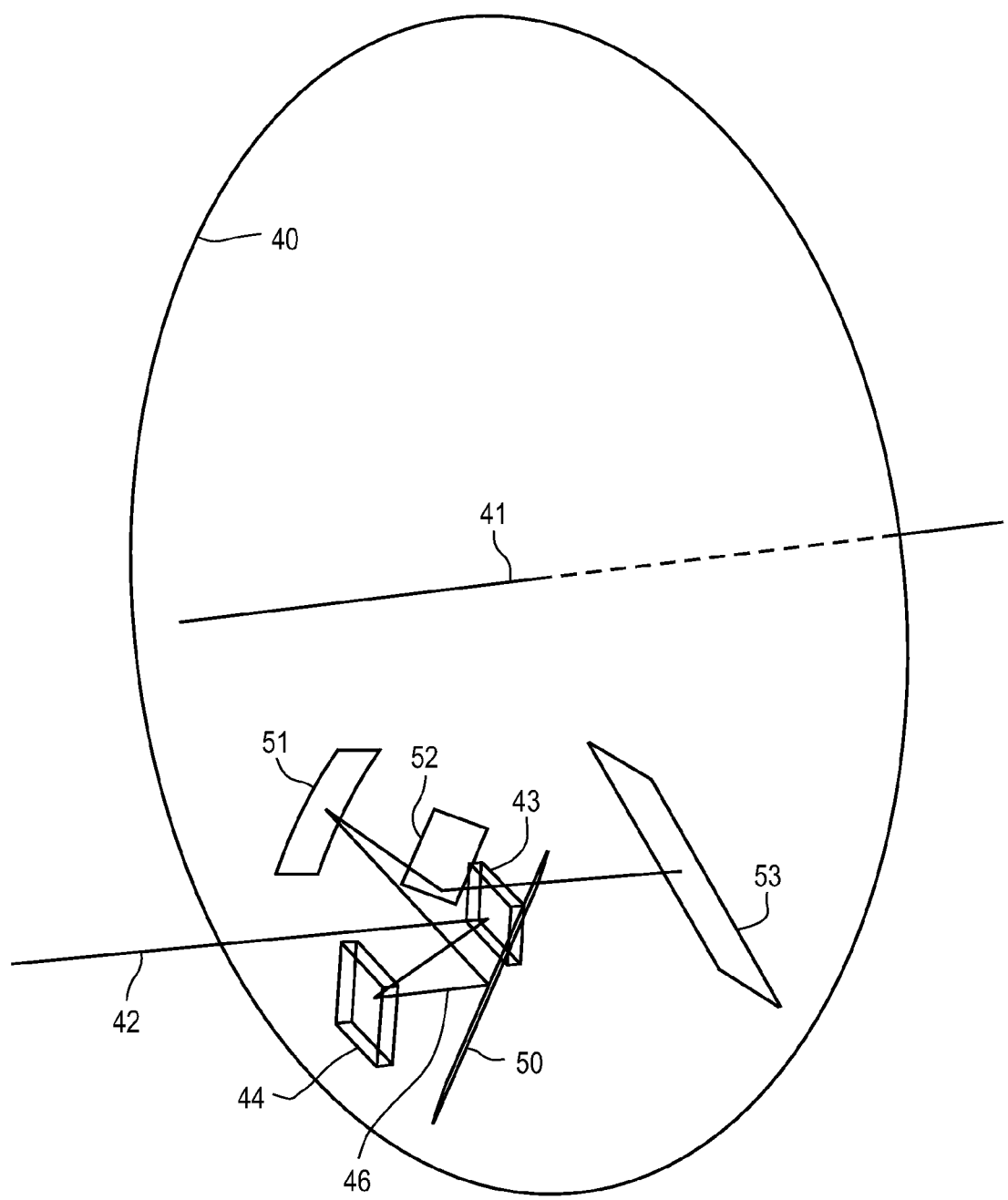

FIG. 5B shows a perspective view of FIG. 5A. The rotating disk 40 with its axis of rotation 41 is shown supporting two surface segments 43 and 44, which are segments of aspheric surfaces of rotation with their common optical axes coincident with the rotation axis 41. As disk 40 rotates, a different pair of surface segments (not shown) would intercept the incident optical beam 42 and change the deflection angle of the exiting optical beam 46 just before the optical beam enters the imaging lens group 45. The imaging lens group 45 comprises a first planar fold mirror 50, an image forming mirror 51 that is preferably an anamorphic aspheric surface to produce near diffraction-limited image spots, and a second planar fold mirror 52 that directs the image to the preferred location in space required for certain applications with long working distances.

Applications that do not require near diffraction-limited image spots can use image forming mirrors 51 that are toric in form such that astigmatism is corrected or spherical in form if non-circular image spots are acceptable for an application.

Figure 5C:
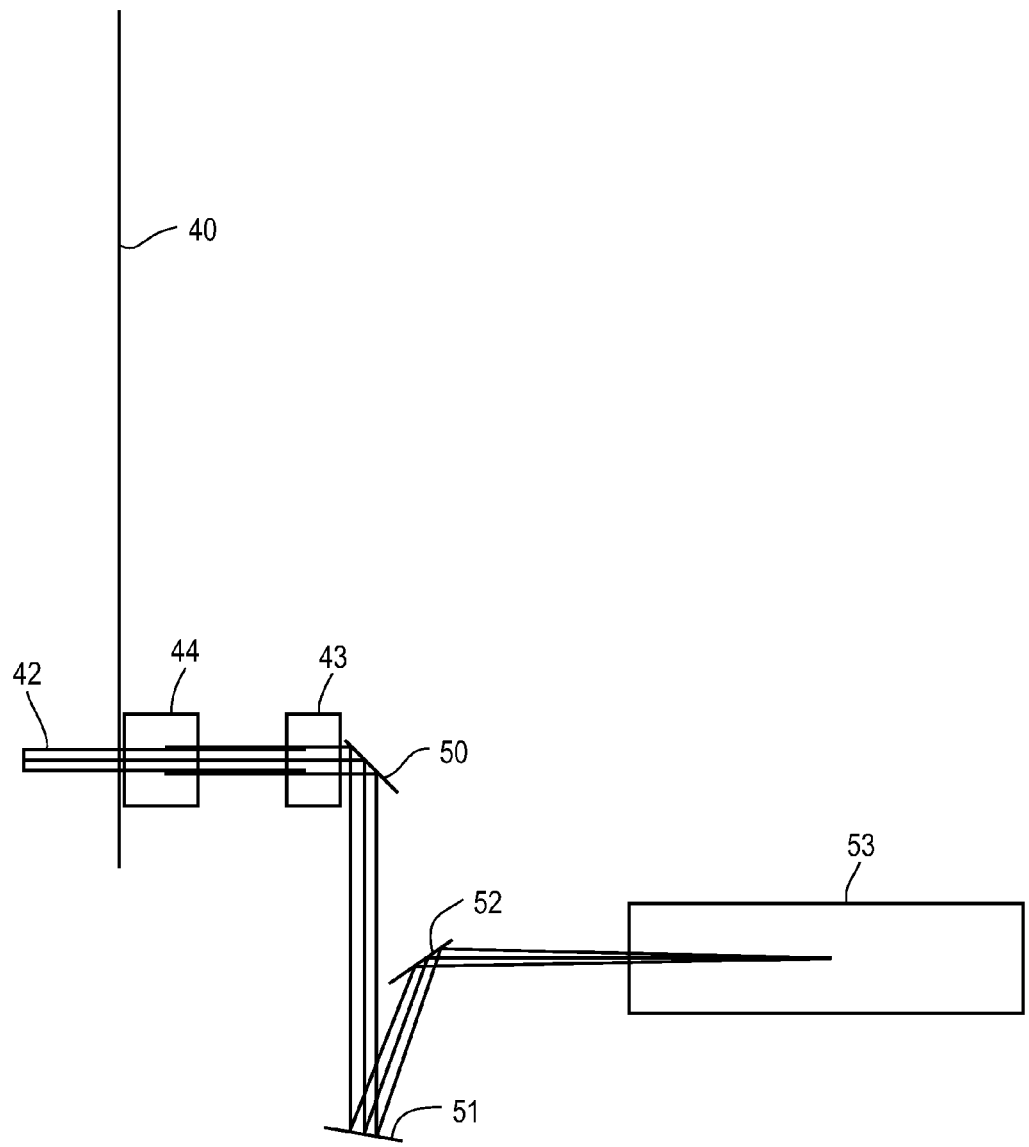

FIG. 5C is a top view of this embodiment that shows the folded geometry used in one embodiment of the imaging lens group. This folded geometry avoids self-obscuration of the optical path by using an off-axis segment of an image forming mirror 51 or a tilted segment of an image forming mirror 51. This decentered geometry introduces astigmatism when the image forming mirror 51 is spherical in form. This astigmatism can be largely corrected by making the image forming mirror 51 toroidal or aspheric toroid in form. Further image correction is achieved by making the image forming mirror 51 an anamorphic asphere which consists of two aspheric shapes orthogonally oriented on the reflecting surface.

Figure 6:
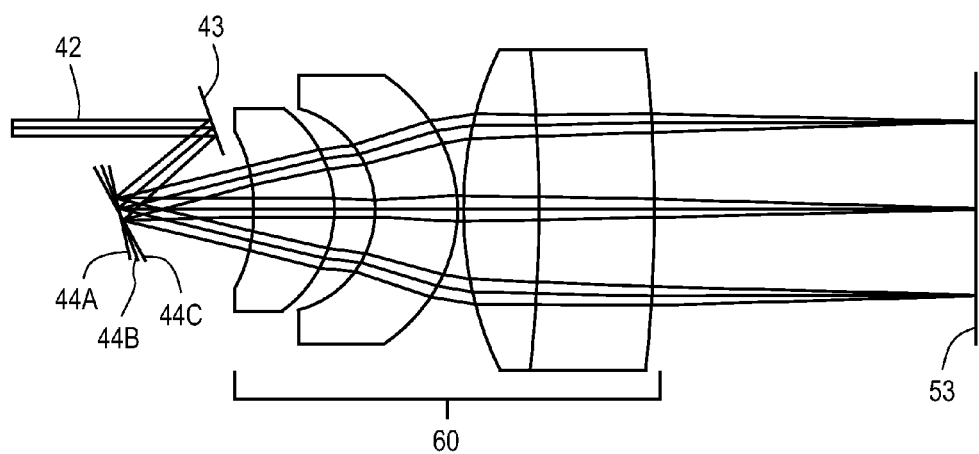
FIG. 6 is a side view of another optical pattern generator using anamorphic aspheric surface segments and a refractive imaging group.

A variant of this embodiment is shown in FIG. 6 where the reflecting surface segments 43, 44 are from parent surfaces which are toric or anamorphic aspheric in form. This variant provides both beam angle variation for different optical paths and full correction of the refractive power so the rotating component is afocal and the image surface is normal to the system optical axis. Because the toric or anamorphic asphere segments 43, 44 change their profile as they are rotated, a small orthogonal displacement of the image spots which is dependent also upon spot linear displacement on the image surface will exist. For applications where the exposure period and therefore the rotation angle is small, this variant configuration may be acceptable.

Figure 7:
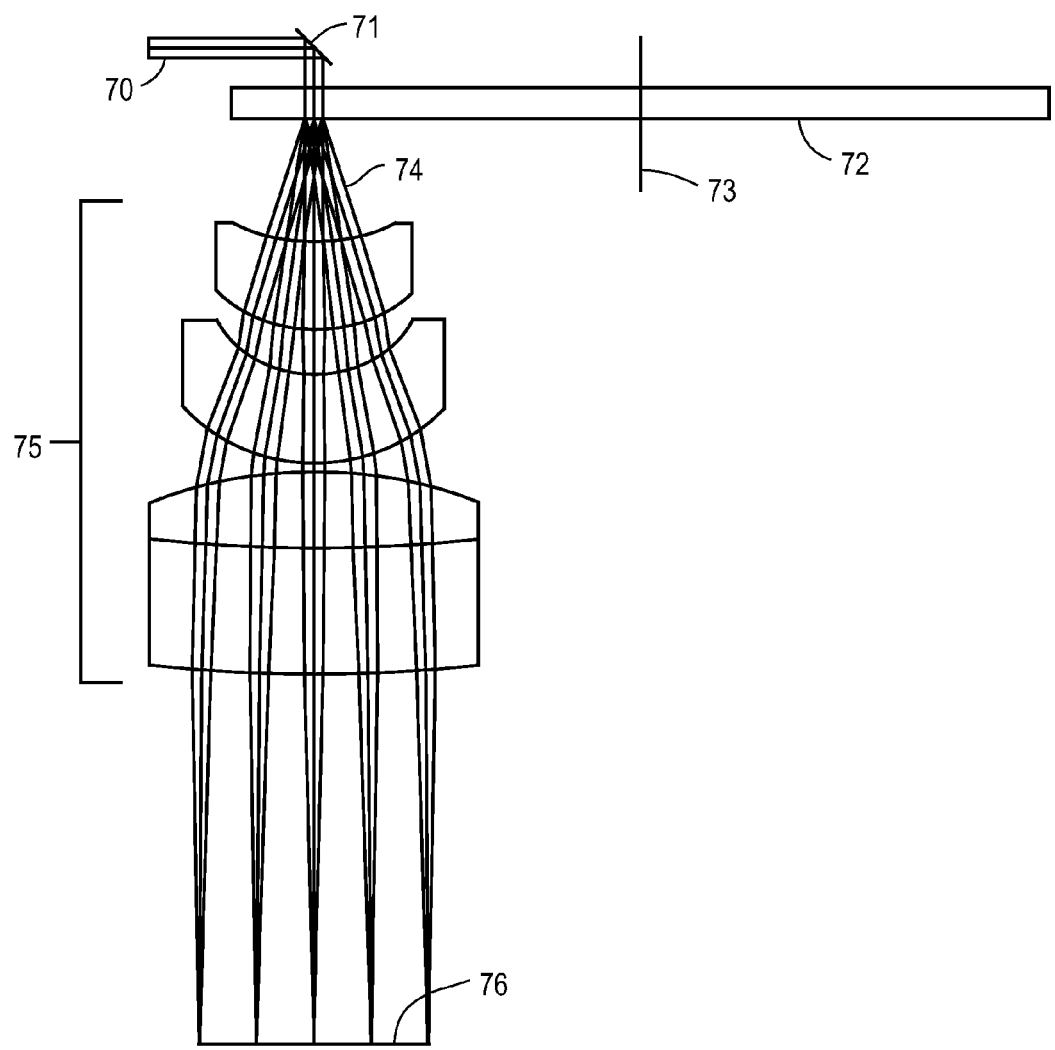
FIG. 7 is a side view of another optical pattern generator using diffractive elements on the top of a disk shaped substrate.

FIG. 7 is a view of another optical pattern generator using diffractive elements to deflect an incident optical beam into a series of output optical beams. In FIG. 7, an input optical beam 70 is incident upon a fold mirror 71 and then passes through a rotating disk 72 which has a series of deflection sectors, each of which has diffractive optical element(s) located on the disk periphery. The disk 72 is rotated about its axis 73. Output optical beams 74 produced by different sectors are shown entering an imaging lens group 75, which forms a pattern on the image surface 76. Each diffractive optical element has a different spatial period such that each succeeding sector causes a different angular deviation of the optical beam, which the imaging lens group 75 focuses to a different spot along the focal line.

In a preferred embodiment, the diffractive elements uses diffractive structures that are arctuate in form rather than parallel lines and the arctuate grooves have an axis that is coincident with the rotation axis 73. This diffractive structure does not deflect the transmitted wavefront at a single angle but introduces a small angular variation of the wavefront which causes a small blurring of the image spots. This unwanted blurring can be partially corrected by the design of the imaging lens group so the image spots approach diffraction-limited quality. The arctuate nature results in spatial invariance as each sector rotates through the incident optical beam 70. A variant of this embodiment uses reflective diffractive optical elements.

Figure 8:
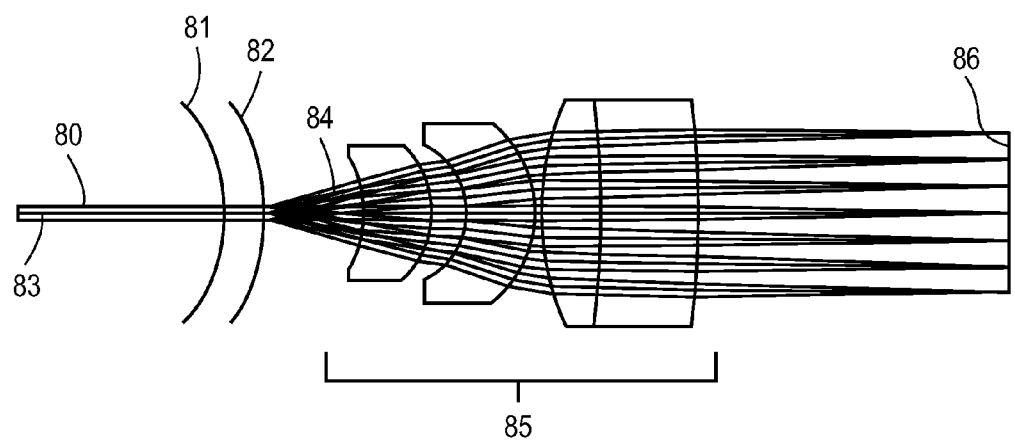
FIG. 8 is a side view of another optical pattern generator with diffractive elements on the side of a barrel shaped substrate.

FIG. 8 is a view of another optical pattern generator according to the invention. In this example, the rotating component has rotation axis 83. In FIG. 8, the input optical beam 80 first passes through the internal cylindrical surface 81 and subsequently through the cylindrical surface 82. The cylindrical surfaces have a common rotation axis 83. Surface 82 is divided into sectors, each containing optical elements. In FIG. 8, these optical elements are linear diffraction gratings with different periodicity. With respect to FIG. 8, the rulings of the grating run in the direction perpendicular to the paper. Each diffractive grating surface deflects the output optical beam 84 by a different angle and the imaging lens group 85 forms a pattern of spots on the image surface 86. The use of linear gratings means that the sectors are spatially invariant as they rotate through the optical beam 80.

In alternate embodiments, refractive or reflective optical elements may also be used. For example, reflective facets may act on the input optical beam at cylindrical surface 82, or refractive prisms may be used on cylindrical surface 82. In addition, elements may be placed on both surfaces 81 and 82, for example to form a Z-shaped folded optical path, analogous to FIG. 4.

The above examples are discussed in the context of one incident optical beam and one output optical beam. The invention is not limited to this case. For example, referring to FIG. 1A, more than one optical beam may be simultaneously incident on the sector shown. The optical beams may or may not be overlapping. Overlapping beams may be combined upstream of the rotating component 9, for example by a wavelength-sensitive device, and then propagate together along the same optical path to the rotating component 9. Alternately, the optical beams may arrive at the same spot within a sector but from different angles. In FIG. 1A, a second source might be located slightly above the plane of the paper but travel at a slight downward angle so that it is incident on the sector at the same location as optical beam 1 shown in FIG. 1A.

Alternately, the optical beams may not overlap at all. In FIG. 1A, the prisms may extend in the direction perpendicular to the paper and the single optical beam 1 may be replaced by an array of optical beams also extending in the direction perpendicular to the paper. As a final example, more than one sector may be active at a time. In FIG. 1A, the optical beam 1 originates from the left and is incident at approximately the 7:30 position of rotating component 9. A second optical beam may originate from the right and be incident at the symmetrical 4:30 position. Optical beams can be incident at other positions also, although the subsequent imaging may become more complex.

The optical pattern generators described above can be used in many different applications. Some examples of biological applications are described in U.S. patent application Ser. Nos. 10/888,356 "Method and Apparatus for Fractional Photo Therapy of Skin," 10/751,041 "Multi-Spot Laser Surgical Apparatus and Method" and 60/_____ (attorney case number 9454) "Optically-Induced Treatment of Internal Tissue," all of which are incorporated herein by reference.

Figure 9A:
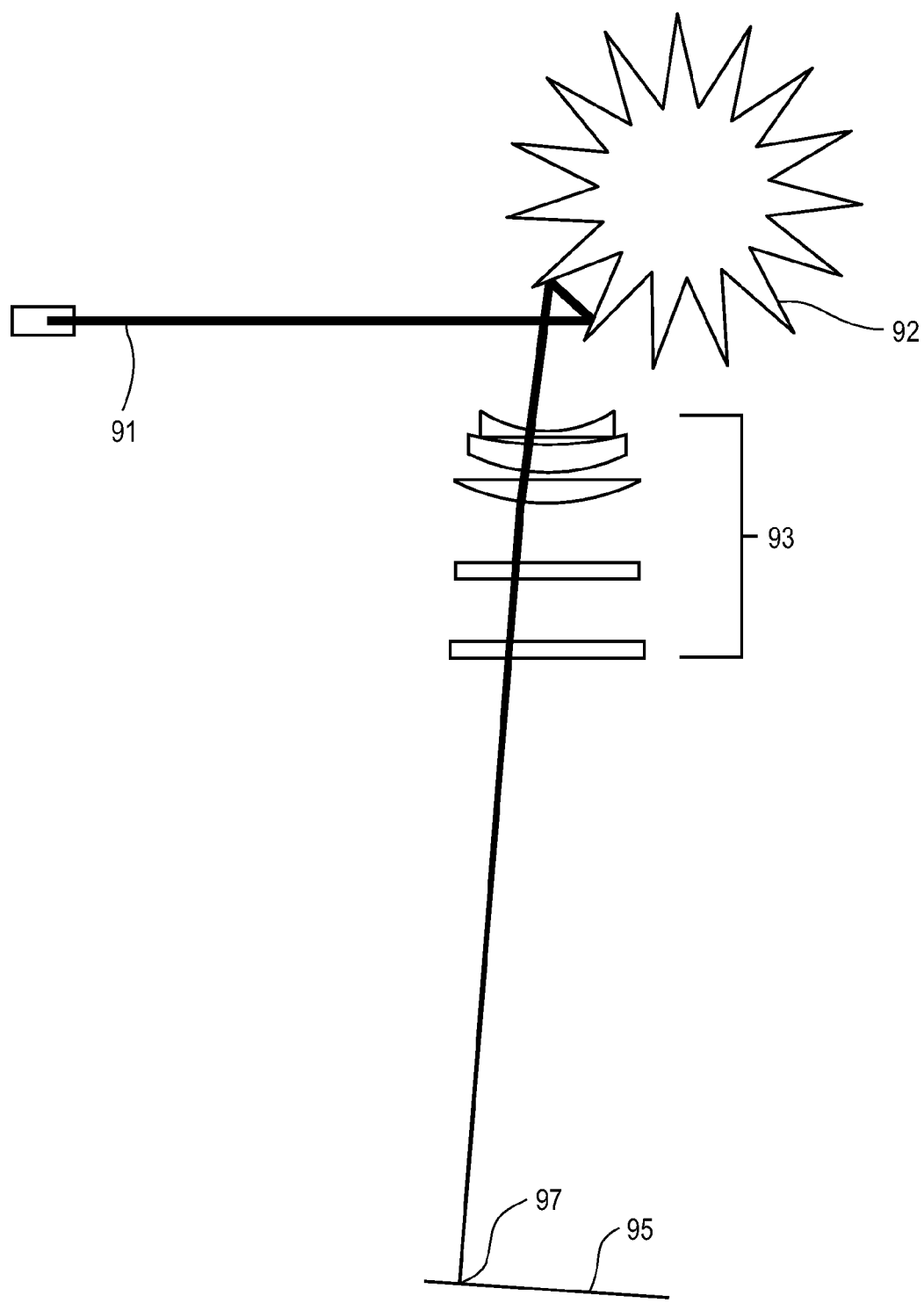
FIGS. 9A-9B are a side view and perspective view of an industrial welding application using the optical pattern generator of FIG. 1.
Figure 9B:
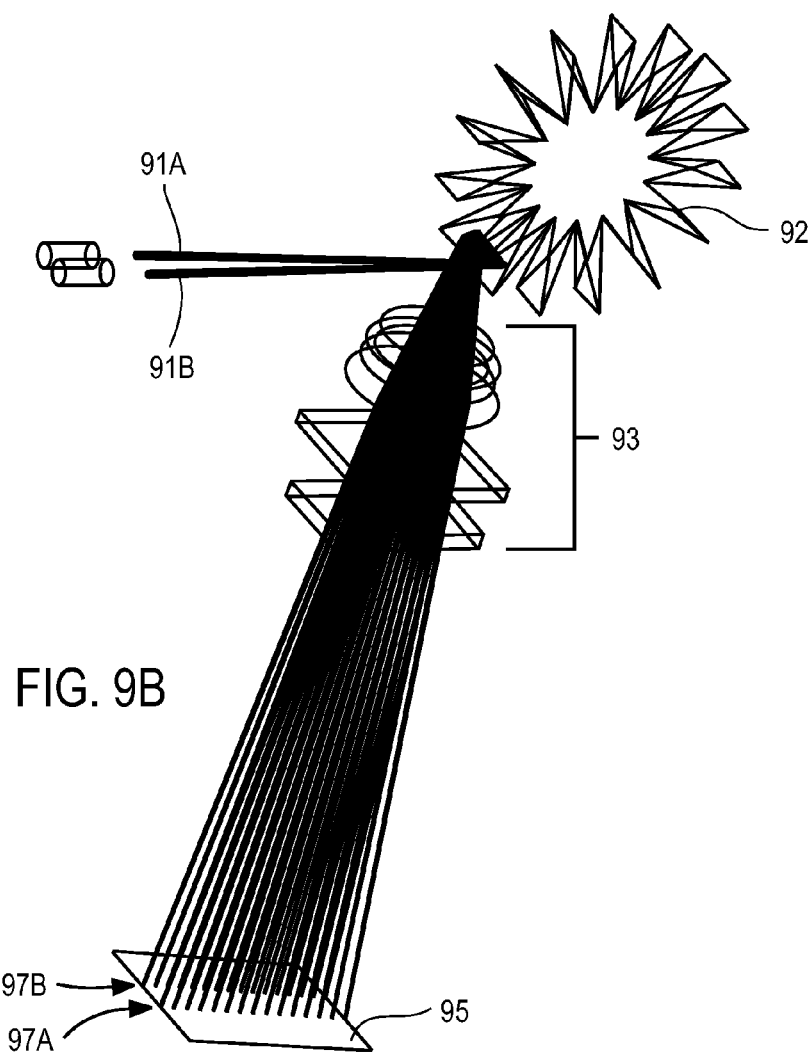

Various industrial applications will also be apparent. One example is shown in FIGS. 9A-9B. In this example, the optical pattern generator shown in FIG. 1 is used to direct a laser beam 91 to various spots on a workpiece 95 to produce weld joints 97. FIG. 9A shows a single laser beam 91, deflected by one sector of the optical pattern generator 92 and focused by lens 93 onto workpiece 95.

FIG. 9B shows a perspective view. In addition, two laser beams 91A-91B are used simultaneously to produce two parallel rows of welds 97A-97B. FIG. 9B also shows the entire pattern of welds produced by all sectors. For each laser beam, each focus spot shown in FIG. 9B is produced by a different sector of the optical pattern generator 92.

Figure 9C:
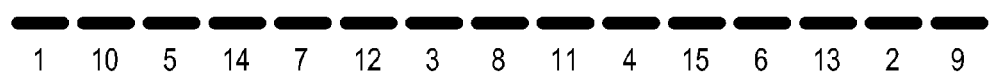
FIGS. 9C and 9D illustrate welding patterns that can be produced from scanners similar to those shown in FIGS. 9A-9B.

FIG. 9C illustrates one row 97 of the welding pattern shown in FIG. 9B. There is a total of fifteen tack welds. The numbers show the order in which the welds are generated. Notice that the welds are not generated in order from left to right. Instead, a far left weld 1 is generated and then a far right weld 2 is generated. The remaining welds are selected to tack long spans at their midpoints. For example, weld 3 tacks approximately the middle of the span between welds 1 and 2; weld 4 tacks the midpoint between 2 and 3 (which is the then-longest span); weld 5 tacks approximately the middle between welds 1 and 3, etc.

This approach is advantageous because the initial two welds constrain the part at both ends, thus reducing the need for clamping. In addition, the laser energy is distributed across the workpiece, thus avoiding excess heat buildup as might be the case if the welds were made sequentially from left to right. Tacking the midpoints of long spans also controls the effect of differential thermal expansion due to local heat buildup.

Figure 9D:
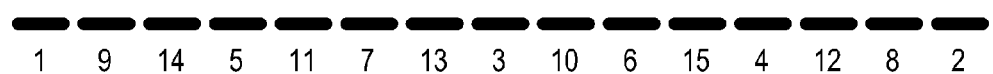

Due to symmetry in the welding pattern, the same effects may be realized by starting with weld 9 rather than weld 1. This reduces the wait time before start of the welding pattern. If the workpiece is ready for welding but the active sector is the one for weld 2, the device need only wait until the sector for weld 9 rather than waiting for the entire pattern to cycle back to weld 1. Weld speeds of 1-10,000 welds per second could be produced with the invention, preferably with weld speeds of hundreds or thousands of welds per second. As shown in FIG. 9D, the control of thermal expansion can be optimized further if symmetry is not required for the scanner wheel. Other arrangements will be obvious to those skilled in the art.

Figure 10:
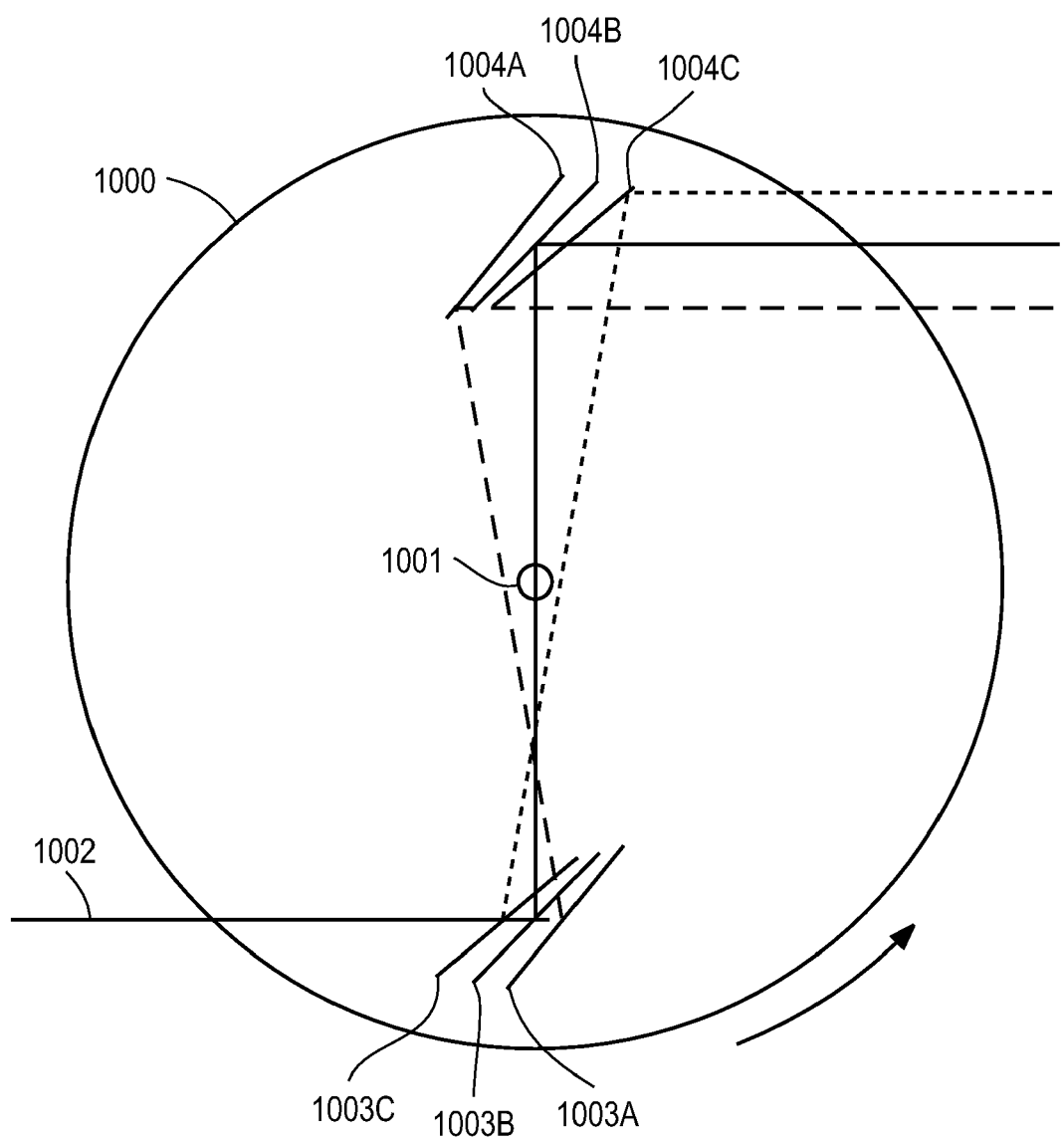
FIG. 10 illustrates another optical pattern generator using a rhomboid mirror geometry.

FIG. 10 illustrates another optical pattern generator according to the invention. This optical pattern generator uses a single rotating component 1000 with rotation axis 1001 to generate the pattern of interest. In this example, each segment is comprised of a pair of reflective surfaces 1003 and 1004, which are supported by the single rotating component 1000. Three different rotational angles of the single rotating component 1000 are superimposed in FIG. 1 to illustrate the deflection of the incident optical beam 1002 from the pair of reflective surfaces 1003 and 1004 as the single rotating component is rotated. This rotation produces three separate positions for 1003 and 1004, which are illustrated as 1003A, 1003B, and 1003C; and 1004A, 1004B, and 1004C respectively. The deflection angle of the incident optical beam is preserved (because of the reflection off an even number of surfaces) as the component 1000 is rotated.

Although the detailed description contains many specifics, these should not be construed as limiting the scope of the invention but merely as illustrating different examples and aspects of the invention. It should be appreciated that the scope of the invention includes other embodiments not discussed in detail above. For example, the optical beam can be incident at angles other than the parallel to or normal to the plane of rotation of the rotating component. In addition, different wavelengths can be used depending on the specific application. Generally, the term optical beam is used to refer to electromagnetic radiation having at least half of its power in the wavelength range of 200 to 12000 nm. Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An optical pattern generator for generating a pattern of figures, the optical pattern generator comprising a rotatable component rotating about a rotation axis, the rotatable component comprising a plurality of deflection sectors arranged around the rotation axis, where each sector comprises at least two reflective surfaces that in combination deflect an incident optical beam by a substantially constant angular deflection as the sector rotates through the incident optical beam and at least two of the sectors deflect the incident optical beam by different angular deflections to generate figures at different locations.

2. The optical pattern generator of claim 1 where:
   the deflection sectors are arranged approximately in a circle that is centered on the rotation axis and lies substantially in a plane of rotation that is perpendicular to the rotation axis;
   the sectors are substantially self-compensating with respect to a rotation of the rotatable component and are substantially spatially invariant with respect to a wobble of the rotatable component; and
   the angular deflection is primarily in the plane of rotation.

3. The optical pattern generator of claim 1 where:
   the deflection sectors are arranged approximately in a circle that is centered on the rotation axis and lies substantially in a plane of rotation that is perpendicular to the rotation axis; and
   for a majority of the sectors, the sector comprises a pair of opposing reflective surfaces with surface normals that have a substantial component in the plane of rotation.

4. The optical pattern generator of claim 3 where the rotatable component comprises a plurality of structures arranged approximately around the circle, each structure having at least two reflective faces, where reflective faces from adjacent structures form opposing reflective surfaces for the sectors.

5. The optical pattern generator of claim 4 where the structures are prisms.

6. The optical pattern generator of claim 4 where the structures are prisms and approximately every other prism is aligned so that a bisection line of an apex angle of the prism also runs through the rotation axis.

7. The optical pattern generator of claim 4 where the structures have a same shape but are tilted at different angles with respect to the circular arrangement to produce different deflection angles for the sectors.

8. The optical optical pattern generator of claim 4 where sectors cause angular deflections that alternate between above a nominal magnitude and below a nominal magnitude.

9. The optical pattern generator of claim 3 where the opposing reflective surfaces form a Penta mirror geometry.

10. The optical pattern generator of claim 3 where, for a majority of the sectors, the incident optical beam is reflected from an even number of reflective surfaces in the sector.

11. The optical pattern generator of claim 3 where the rotatable component includes an odd number of sectors.

12. The optical pattern generator of claim 3 where reflective surfaces for at least some of the sectors introduce an angular deflection with a component normal to the plane of rotation.

13. The optical pattern generator of claim 12 where the normal component of the angular deflection alternates between two magnitudes as the sectors rotate through the incident optical beam.

14. The optical pattern generator of claim 1 where:
the deflection sectors are arranged approximately in a circle that is centered on the rotation axis and lies substantially in a plane of rotation that is perpendicular to the rotation axis;
the sectors are substantially self-compensating with respect to wobble of the rotatable component and are substantially spatially invariant with respect to rotation of the rotatable component; and
the angular deflection is primarily not in the plane of rotation.

15. The optical pattern generator of claim 1 where:
the deflection sectors are arranged approximately in a circle that is centered on the rotation axis and lies substantially in a plane of rotation that is perpendicular to the rotation axis; and
for a majority of the sectors, the sector comprises a pair of opposing reflective surfaces with surface normals that have a substantial component in a direction normal to the plane of rotation.

16. The optical pattern generator of claim 15 where each of the opposing reflective surfaces is a surface of revolution with optical axis approximately coincident with the rotation axis.

17. The optical pattern generator of claim 16 where the opposing reflective surfaces for different sectors have different radii or different separation, and at least one sector does not angularly deflect the incident optical beam.

18. The optical pattern generator of claim 16 where at least some of the reflective surfaces are aspheric.

19. The optical pattern generator of claim 15 where the reflective surfaces for at least some of the sectors introduce an angular deflection with a component not in a plane containing the incident optical beam and the rotation axis of the rotating component.

20. The optical pattern generator of claim 1 further comprising a first non-rotating reflective surface; where:
the deflection sectors are arranged approximately in a circle that is centered on the rotation axis and lies substantially in a plane of rotation that is perpendicular to the rotation axis; and
for a majority of the sectors, the sector comprises a second reflective surface with surface normal that does not have a substantial component in the plane of rotation, the first and second reflective surfaces forming a pair of opposing reflective surfaces for deflecting the incident optical beam.

21. The optical pattern generator of claim 20 where each of the opposing reflective surfaces is a surface of revolution with optical axis coincident with the rotation axis.

22. The optical pattern generator of claim 1 further comprising:
an imaging element positioned to receive the deflected optical beams and to convert different angular deflections into different beam positions on a target surface such that one or more of the figures moves across a target surface due to the rotation of the rotatable component.

23. The optical pattern generator of claim 1 further comprising:
an imaging lens group positioned to receive the deflected optical beams and convert the different substantially constant angular deflections into different image positions within the pattern of figures, where each image position is substantially stationary as the corresponding sector rotates through the incident optical beam.

24. The optical pattern generator of claim 23 where the imaging lens group comprises a solid catadioptric monolithic component produced from a single block of optical material.

25. The optical pattern generator of claim 24 where the solid catadioptric monolithic component includes, in the following order along an optical path, an entry window, a reflective optical path-folding surface, a curved reflective surface and an exit window surface.

26. The optical pattern generator of claim 25 where the reflective optical path-folding surface and the exit window surface are a same physical surface.

27. The optical pattern generator of claim 1 further comprising:
at least two simultaneously incident optical beams.

28. The optical pattern generator of claim 27 where, for a majority of the sectors, at least two optical beams are incident on the sector for each rotation of the rotatable component.

29. The optical pattern generator of claim 28 where, for a majority of the sectors, at least two optical beams are simultaneously incident on the sector at one angle in the rotation of the rotatable component.

30. The optical pattern generator of claim 28 where, for a majority of the sectors, a first optical beam is incident on the sector at a first angle in the rotation of the rotatable component, a second optical beam is incident on the sector at a second angle in the rotation of the rotatable component, and the two optical beams are not simultaneously incident on the sector for any angle in the rotation of the rotatable component.

31. The optical pattern generator of claim 1 where the pattern of figures is an array of spots, where each spot is substantially stationary as the corresponding sector rotates through the incident optical beam.

32. The optical pattern generator of claim 31 where the spots are moved to compensate for motion of a workpiece.

33. The optical pattern generator of claim 1 where parameters for the optical beam are selected to ablate material.

34. The optical pattern generator of claim 1 where parameters for the optical beam are selected to cauterize material.

35. The optical pattern generator of claim 1 where parameters for the optical beam are selected to treat human tissue.

36. The optical pattern generator of claim 1 where parameters for the optical beam are selected to treat human skin.

37. The optical pattern generator of claim 1 where the rotatable component comprises a rotatable hollow cylindrical component rotating about the rotation axis, the cylindrical component comprising a plurality of deflection sectors arranged around the cylindrical component, where each sector deflects an incident optical beam by a substantially constant angular deflection as the sector rotates through the incident optical beam and at least two of the sectors deflect the incident optical beam by different angular deflections to generate figures at different locations.

38. The optical pattern generator of claim 37 where the incident optical beam originates from an interior of the cylindrical component.

39. The optical pattern generator of claim 37 where the incident optical beam originates from an exterior of the cylindrical component.

40. The optical pattern generator of claim 37 where a majority of the sectors includes a prism, and prisms for and at least two sectors have different apex angles.

41. The optical pattern generator of claim 1 where each of the sectors deflects the incident optical beam by a different angular deflection.

42. The optical pattern generator of claim 3 where the angular deflections for all of the deflection sectors lie primarily in the plane of rotation.

43. The optical pattern generator of claim 3 where the incident optical beam lies primarily in the plane of rotation.

44. The optical pattern generator of claim 23 where each deflection sector deflects the incident optical beam to a different one of the figures in the pattern of figures.

45. The optical pattern generator of claim 23 where the pattern of figures is a linear array of figures.

46. The optical pattern generator of claim 23 where the pattern of figures is a two-dimensional pattern of figures.

47. An optical pattern generator for generating a pattern of figures, the optical pattern generator comprising a rotatable component rotating about a rotation axis, the rotatable component comprising a plurality of deflection sectors arranged around the rotation axis, where each sector deflects an incident optical beam by a substantially constant angular deflection as the sector rotates through the incident optical beam and at least two of the sectors deflect the incident optical beam by different angular deflections located substantially in a plane perpendicular to the direction of the rotation axis to generate figures at different locations.

48. The optical pattern generator of claim 47 where the pattern of figures is an array of spots and each spot is substantially stationary as the corresponding sector rotates through the incident optical beam.

49. The optical pattern generator of claim 47 where the spots move to compensate for relative motion of a workpiece.

* * * * *

UNITED STATES PATENT AND TRADEMARK OFFICE
CERTIFICATE OF CORRECTION

| | | |
|---|---|---|
| PATENT NO. | : 7,372,606 B2 | Page 1 of 1 |
| APPLICATION NO. | : 11/158907 | |
| DATED | : May 13, 2008 | |
| INVENTOR(S) | : Barry G. Broome, Leonard C. DeBenedictis and George Frangineas | |

It is certified that error appears in the above-identified patent and that said Letters Patent is hereby corrected as shown below:

Column 14,
Line 53, please delete the second occurrence "optical".

Signed and Sealed this

Sixteenth Day of September, 2008

JON W. DUDAS
*Director of the United States Patent and Trademark Office*